Oct. 26, 1937.    M. N. RUSSELL ET AL    2,097,346
FAN HANGER OUTLET
Filed March 5, 1936
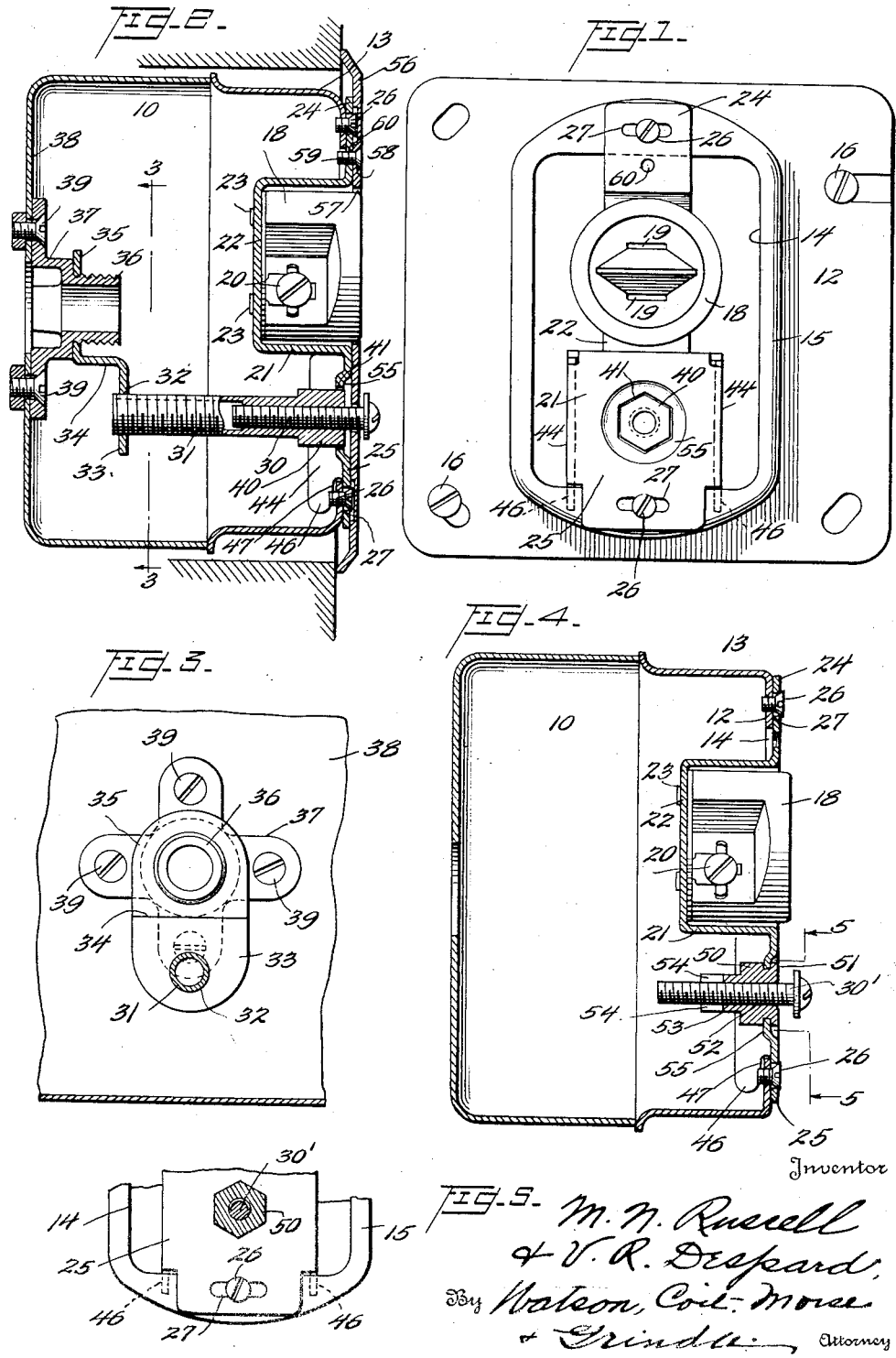
Inventor
M. N. Russell
& V. R. Despard,
By Watson, Coit, Morse
& Grindle, Attorney Patented Oct. 26, 1937

2,097,346

UNITED STATES PATENT OFFICE 2,097,346

FAN HANGER OUTLET

Mark N. Russell and Victor R. Despard, Syracuse, N. Y., assignors to Pass & Seymour, Inc., Syracuse, N. Y., a corporation of New York Application March 5, 1936, Serial No. 67,376

14 Claims. (Cl. 247—20)

This invention relates to electric convenience outlets and more particularly to those fittings customarily known as hanger outlets or electric fan hangers.

It is a general object of the present invention to provide novel and improved hanger outlets of the type described.

An important feature of the invention resides in the construction of the mounting plate or strap for the electrical fitting whereby it engages the edge of the cover plate opening of the junction box to which it is fitted in such a manner that at least a portion of the vertical component of the fan load is transferred directly to this cover plate and not imposed on the small fastening screws for the mounting strap.

Another important feature of the invention resides in the provision on one end of the mounting strap or plate of furcations which straddle the edge of the opening in the junction box cover plate insuring against pulling away the mounting plate from the box by virtue of the horizontal component of the fan load.

Another important feature of one embodiment of the invention resides in the provision of an adjustable stud adapted to be carried by the box proper, and independent of the cover, which supports the hanger bolt and which has such cooperation with the mounting plate for the electric fitting that it is locked in position by this fitting.

Another important feature of this embodiment resides in the combination of a junction box cover-supported mounting plate for the electric fitting and a box proper support for the fan hanger bolt together with means to transfer a portion of the vertical component of the fan load from the hanger bolt support to the box cover through the mounting plate.

A still further feature of the invention resides in the provision of adjustable support means for the fan hanger bolt adapted for attachment to the conventional fixture stud or crow's-foot secured to the bottom of the junction box.

Other and further features and objects of the invention will be more apparent to those skilled in the art upon a consideration of the accompanying drawing and following specification wherein are disclosed several exemplary embodiments of the invention with the understanding that such changes may be made therein as fall within the scope of the appended claims without departing from the spirit of the invention.

In said drawing;

Figure 1 is a face view of a junction box equipped with a fan hanger receptacle in accordance with one embodiment of the present invention, the usual finish plate being left off for the sake of clarity;

Figure 2 is a vertical central section through the device of Figure 1 but showing the finish plate in position;

Figure 3 is a fragmentary section of line 3—3 of Figure 2;

Figure 4 is a view similar to Figure 2 but showing a different embodiment of the invention and omitting the finish plate, and Figure 5 is a fragmentary section on broken line 5—5 of Figure 4.

Electric fittings, of the type to which this invention applies, fall generally into two broad classes, the first, required in all high class construction, provides means to support the very considerable weight of the fan or other electrical devices directly from the main portion of the junction box which can be very securely attached to structural members of the wall, while the second form, usually specified where costs must be kept low, provides the support for the fan directly from the mounting plate or strap, for the electrical fitting, which is attached in one manner or another to the cover of the junction box. Such covers are conventionally attached to the box proper by two rather small screws. In standard boxes these screws are 6/32. The same size screws are used for attaching the mounting plate to the box cover and in most cases some provision is made for a more secure attachment of at least the end of the mounting strap nearest to the fan hanger bolt. The present invention contemplates improvements in both general forms of fan hanger outlets in such a manner that the mounting strap is identical for both, whereby manufacturing economies are effected.

It is standard practice to support fan hanger outlets from junction boxes approximately 4 inches square such as shown at 10 in the drawing. These boxes are fitted with covers 12 of the plaster ring type having the protruding neck 13 of varying depths from ¼ to 1¼ inches depending on conditions. These covers are provided with substantially rectangular openings 14 surrounded by a flat border area 15 of varying widths. The size of the opening is practically standardized. Each cover is attached to its box by two screws 16 as shown.

In each form of the invention there is provided an electric convenience outlet 18 of any conventional form adapted to receive in the openings 19 the blades of an attachment plug and having on its side faces wiring terminals 20. This outlet is provided with a mounting plate or strap 21 which in the form shown has a U-shaped intermediate portion to receive the fitting which is attached to the bottom 22 thereof by rivets 23 or any other desired fastenings. Extending laterally from the arms of the U are the short and long ends 24 and 25 respectively, of the mounting strap, both in the same plane and slightly below the face of the outlet.

The over all length of the mounting plate is such that it may span the length of the opening 14 with the two ends positioned on the outer face of the border area as shown in Figure 1 to which they may be attached by mounting screws 26, passing loosely through elongated slots 27 in the strap, and threaded into the metal of the border. The slots permit slight adjustments to insure vertical alinement of the mounting plate and hence of the finish plate which is attached to it.

It will be noted that the outlet is positioned eccentrically in the opening in the cover plate and since in most cases the fixtures are intended for use on a side wall, it can be said that the mounting plate is positioned vertically with the short end at the top. This leaves a space below the outlet for the passage of a fan hanger screw or bolt 30, which extends through the mounting plate.

In the form of invention shown in Figures 1, 2 and 3, this fan hanger bolt is screwed into a hollow stud 31 which is both interiorly and exteriorly threaded. This stud is adjustably received in the threaded aperture 32 of one arm 33 of the offset bracket 34, the other arm 35 of which is perforated and threaded to be received over the spud 36 of the conventional fixture stud or crow's-foot 37 which is secured to the bottom wall 38 of the box proper by suitable screws 39 in the usual manner. The stud is centrally mounted in the box and the distance between the openings in the bracket 34 is just proper to position the stud 31 so that its enlarged and hexagonal outer end 40 can pass through the correspondingly shaped opening 41 in the mounting plate 21.

Adjustment for the depth of the plaster-ring cover is had before the mounting plate is secured in place both by screwing the bracket 34 in or out on the spud 36 and by adjusting the stud 31 in the bracket opening 32. The adjustment once made is fixed by the cooperation of the non-circular head 40 and the correspondingly shaped opening 41 in the mounting plate. The adjustment should be such that the end of the stud 31 does not protrude beyond the face of the mounting plate so as not to interfere with the finish plate which is subsequently applied.

An inspection of Figure 2 will show that a large portion of the vertical component of the weight of the fan supported by the fan hanger screw 30 and also all of the horizontal component thereof will be transferred from the screw 30 to the stud 31 and thence through the inter-connecting parts to the rear wall of the box proper, placing substantially no strain on the screws holding the box cover or those holding the mounting plate.

Because of looseness of the screw fits in this chain of parts there will be some vertical load transferred to the mounting plate 21 by virtue of contact between the head of the stud 31 and the lower portion of the edge of the opening 41 in the mounting plate. In order to properly absorb this load without placing it on the screws 26 which attach the mounting plate to the box cover the reinforcing flanges 44 on the sides of the long end 25 of the mounting plate are extended into tongues or hooks 46, the forward edges 47 of which converge upwardly toward the main portion of the end 25 to provide notches which fit over the border 15 surrounding the aperture in the box cover as clearly seen in Figure 2. This provides then two seats for the mounting plate on the edge of the opening in the box cover and directly transfers a portion of the vertical load to this cover.

In the form of device shown in Figures 4 and 5, the construction of the mounting plate is identical with that just described but instead of having a large free aperture 41 for the passage of the head of the stud 31 this aperture is substantially closed by a bushing 50 the largest portion of which is beneath the mounting plate. A portion of the bushing of reduced diameter protrudes through the aperture and is spun or turned over the face of the plate as shown in 51 to secure it firmly in position, the non-circular shape of the aperture insuring against relative rotation. This bushing is internally threaded as at 52 to receive the fan hanger screw or bolt 30'. If desired, a sleeve 53 may extend rearwardly from the bushing and be split as at 54 and somewhat pinched together after the threading to tightly bind the screw 30' to prevent accidental unscrewing due to the vibration of the fan.

In both forms of the invention the mounting plate is shown to be depressed as at 55 surrounding the opening 41. There is no particular purpose for this in connection with Figures 1, 2 and 3, but in the form of Figures 4 and 5 it provides for the reception of the portion 51 of the bushing without having it protrude beyond the face of the plate. It will be seen that the mounting plate is identical in both constructions, and for the purpose of Figures 4 and 5 need only have the bushing spun into the aperture already provided for the form of Figures 1, 2 and 3.

In Figures 4 and 5 all of the load of the fan is carried by the mounting plate so in addition to the notched arrangement for transferring the vertical load to the border of the opening in the box cover, the hooks 46 extend some distance below the opening and will take any horizontal load component which might result from tightening of the screw 30' and thus relieve the mounting plate screws 26 of this strain. These widely spaced hooks or furcations combined with the portion of 25 which rests on the border area 15 effectively prevent any rotation of the mounting plate about a vertical axis. Being fixed in respect to the mounting plate the hooks require no adjustment and no clamping screws resulting in a cheap and effective device which is easily and quickly installed.

In both forms of the invention the conventional flush finish plate 56 is provided, having an aperture 57 to admit the face of the outlet 18, a second aperture to clear the mounting screw and a third one at 58 for the passage of a screw 59 which is received into the opening 60 in the short end of the mounting plate for supporting the finish plate. No lower mounting screw is necessary since rotation of the finish plate about the screw 59 is prevented by engagement of the aperture 57 with the sides of the outlet 18 and further by the screw 30 or 30'.

Having thus described the invention, what is claimed as new and desired to be secured by Letters Patent is:

1. In a hanger outlet of the type described, the combination with a junction box and cover therefor provided with a large opening, of an electric attachment plug receptacle, a mounting plate secured to said receptacle and adapted to span said opening with its ends overlapping the outside of said cover, a screw threaded into said cover to secure one of said ends thereto, the opposite end of said plate having fixed means to engage the inner face of said cover adjacent the opening, a portion of said fixed means being positioned to engage the wall of the cover opening and a hanger device extending through said plate for supporting a translating device from said junction box.

2. In a hanger outlet for fans or the like, the combination, with a junction box having a plaster ring cover with a large opening having a flat border area, of a mounting plate adapted to span said opening with one of its ends overlapping the outside of said border, means to secure said end to said border, the opposite end of said plate being forked to straddle the edge of said opening and engage both the inner and outer faces of said border, an electric convenience outlet supported in the box by said mounting plate with its face extending outwardly through said opening, a hanger screw passing through said plate and a finish plate covering said box and having openings for the passage of said outlet and hanger screw.

3. In a hanger outlet for electric fans, the combination with a wall mounted junction box having a plaster ring cover with a large opening and surrounding flat border, of a mounting plate adapted to span said opening, an electric convenience outlet carried by the said plate in the box with its face protruding through said opening, the ends of the plate resting on the outer face of said border with the plate substantially vertical, removable fastening means for securing the upper end of the plate to said border, means on the lower end of said plate adapted to rest on the edge of the opening and border and a hanger screw for supporting a fan passing through said mounting plate and adapted to transfer at least a part of the vertical load of the fan to said edge through said mounting plate.

4. In a hanger outlet for electric fans for use with a wall mounted junction box having a plaster ring cover with a large opening and surrounding flat border, in combination, a mounting plate adapted to extend vertically across said opening, an electric convenience outlet secured to said plate in a position to fit within the box with its face protruding through said opening, the ends of said plate being spaced to rest on the outer face of said border, a seat on one end of said plate adapted to fit over and rest on the lower edge of said border, means to fasten said plate to said cover, a fan hanger bolt extending loosely through said plate and means to support said bolt from the rear wall of the box proper.

5. In a hanger outlet for electric fans for use with a wall mounted junction box having a plaster ring cover with a large opening and surrounding flat border, in combination, a mounting plate adapted to extend vertically across said opening, an electric convenience outlet secured to said plate in a position to fit within the box with its face protruding through said opening, the ends of said plate being spaced to rest on the outer face of said border, a seat on one end of said plate adapted to fit over and rest on the lower edge of said border, means to fasten said plate to said cover, a fan hanger bolt extending through said plate and means extending loosely through said plate to receive the said bolt and transfer at least a portion of the vertical component only of the fan load to the plate.

6. In a hanger outlet for electric fans for use with a wall mounted junction box having a plaster-ring cover with a large opening and surrounding flat border in combination, a mounting plate adapted to extend vertically across said opening, an electric convenience outlet secured to said plate in a position to fit within said box with its face protruding through said opening, the ends of said plate being spaced to rest on the outer face of said border, a seat on one end of said plate adapted to fit over and rest on the lower edge of said border, means to fasten said plate to said cover, a bracket adapted to be mounted in the box near the bottom thereof and secured to the box proper, a stud threaded into said bracket and having a non-circular head, a correspondingly shaped opening in said plate to admit the head and lock the stud against rotation and a fan hanger screw threaded axially into said stud.

7. In a hanger outlet for electric fans for use with a wall mounted junction box having a fixture stud secured to the bottom wall thereof and a plaster-ring cover with a large opening and surrounding flat border, in combination, a mounting plate adapted to extend vertically across said opening, an electric convenience outlet secured to said plate in a position to fit within said box with its face protruding through said opening, the ends of said plate being spaced to rest on the outer face of said border, a seat on one end of said plate adapted to fit over and rest on the lower edge of said border, means to fasten said plate to said cover, a bracket adjustably mountable on the said fixture stud, a hollow stud threaded into said bracket, a non-circular head thereon, said plate having a correspondingly shaped aperture for the passage of said head and to prevent rotation thereof, and a fan hanger screw threaded axially into said hollow stud.

8. In a hanger outlet for electric fans for use with a wall mounted junction box having a fixture stud secured to the bottom wall thereof and a plaster-ring cover with a large opening and surrounding flat border, in combination, a mounting plate adapted to extend vertically across said opening, an electric outlet secured to said plate in a position to fit within said box with its face protruding through said opening, the ends of said plate being spaced to rest on the outer face of said border, a seat on one end of said plate adapted to fit over and rest on the lower edge of said border, means to fasten said plate to said cover, a bracket adjustably mountable on the said fixture stud, a hollow stud threaded into said bracket, a non-circular head thereon, said plate having a correspondingly shaped aperture for the passage of said head and to prevent rotation thereof, and a fan hanger screw threaded axially into said hollow stud, a portion of the vertical component of the fan load being transferred from the hollow stud to the mounting plate and thence to the box cover by engagement of said head with the lower portion of its aperture.

9. In combination with an outlet box, an apertured cover secured thereto, a plate secured to said cover, an electric outlet supported in said box by said plate, a fan hanger screw, a stud to receive said screw supported from the bottom of said box and extending through said plate, said stud being adjustable by rotation and means on said stud and plate cooperating to lock the stud in adjusted position when the plate is in position.

10. In combination with an outlet box, an apertured cover secured thereto, a plate adjustably secured to said cover, an electric outlet supported in said box by said plate, a fan hanger screw, a stud to receive said screw, means secured to the box bottom to threadedly receive said stud, a non-circular head on said stud, a corresponding shaped opening in the plate to pass said head and to prevent rotation thereof when the plate is in position.

11. A fan hanger outlet comprising the combination with a junction box having a body part and a cover part formed to provide an opening, a plate secured to said cover part and adapted to support an electric outlet in said opening, adjustable means for supporting a fan from the body part of said box and means on said plate to positively lock the adjustment of the fan supporting means.

12. A fan hanger outlet comprising the combination, with a junction box having a body part and a cover part formed to provide an opening, a plate secured to said cover part and adapted to support an electric outlet in said opening, means for supporting a fan directly from said body part said means loosely extending through said plate and engaging the same to directly transfer a portion of the fan load to the cover part and a finish plate covering said box and having openings for the outlet and fan supporting means.

13. A fan hanger outlet comprising the combination, with a junction box having a body part and a cover part formed to provide an opening, a plate secured to said cover part and adapted to support an electric outlet in said opening, means for supporting a fan directly from said body part, said plate resting on and being supported from the lower edge of said opening and contact between said means and plate for transferring a portion of the fan load to said plate.

14. In a hanger outlet for electric fans, the combination, with a wall mounted junction box having a plaster ring cover with a large opening and surrounding flat border, of a mounting strap vertically spanning said opening and having its ends overlapping said border, said strap supporting an electric attachment plug receptacle, the lower end of said strap having backwardly turned flanges extending downwardly into tongues spaced from the end of said strap approximately the thickness of the cover material whereby furcations are provided to straddle the said border, fastening means removably attaching the upper end of said strap to the said border and a hanger device extending through said strap between said furcations and receptacle to support an electric fan.

MARK N. RUSSELL.
VICTOR R. DESPARD.